United States Patent
Vela Garcia

(10) Patent No.: US 11,114,883 B2
(45) Date of Patent: Sep. 7, 2021

(54) METHOD FOR CONTROLLING A CHARGING DEVICE ON BOARD AN ELECTRIC OR HYBRID VEHICLE

(71) Applicant: RENAULT s.a.s., Boulogne-Billancourt (FR)

(72) Inventor: Ruben Vela Garcia, Versailles (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 266 days.

(21) Appl. No.: 16/463,071

(22) PCT Filed: Dec. 14, 2017

(86) PCT No.: PCT/EP2017/082874
§ 371 (c)(1),
(2) Date: May 22, 2019

(87) PCT Pub. No.: WO2018/109103
PCT Pub. Date: Jun. 21, 2018

(65) Prior Publication Data
US 2019/0288539 A1 Sep. 19, 2019

(30) Foreign Application Priority Data
Dec. 14, 2016 (FR) ........................... 1662398

(51) Int. Cl.
*H02J 7/00* (2006.01)
*H02J 7/02* (2016.01)
(Continued)

(52) U.S. Cl.
CPC .............. *H02J 7/022* (2013.01); *B60L 53/20* (2019.02); *B60L 53/60* (2019.02); *H02J 7/0072* (2013.01);
(Continued)

(58) Field of Classification Search
CPC .......... H02J 7/022; H02J 7/06; H02J 2207/20; H02J 7/02; B60L 2210/30; B60L 2210/40;
(Continued)

(56) References Cited

FOREIGN PATENT DOCUMENTS

CN  205407374 U  7/2016

OTHER PUBLICATIONS

L. Shuguang, Y. Zhenxing and C. Gang, "Design and Realization of High Power Density EV Charging Module," 2019 Chinese Control and Decision Conference (CCDC), Nanchang, China, 2019, pp. 4909-4913, doi: 10.1109/CCDC.2019.8832920. (Year: 2019).*

(Continued)

*Primary Examiner* — Zixuan Zhou
(74) *Attorney, Agent, or Firm* — Oblon, McClelland, Maier & Neustadt, L.L.P.

(57) ABSTRACT

A method controls a battery-charging device including a rectifier stage of three-phase Vienna rectifier type capable of being connected to a single-phase or three-phase electrical power supply grid and linked by first and second DC power supply buses to a DC-to-DC converter stage including first and second LLC resonant converters that are connected to first and second DC power supply bus capacitors, respectively, which are positioned on each of the buses at the output of the rectifier stage. The power supply for the charging device is single phase and the voltage of the first and second DC power supply bus capacitors is regulated independently by the first and second LLC resonant converters so as to provide a fixed regulated voltage on each of the DC power supply buses.

12 Claims, 6 Drawing Sheets

(51) Int. Cl.
*B60L 53/60* (2019.01)
*H02J 7/06* (2006.01)
*H02M 1/42* (2007.01)
*H02M 3/335* (2006.01)
*H02M 7/06* (2006.01)
*B60L 53/20* (2019.01)
*H02M 1/12* (2006.01)
*H02M 7/487* (2007.01)
*B60K 6/28* (2007.10)
*H02M 1/00* (2006.01)

(52) U.S. Cl.
CPC ............... *H02J 7/06* (2013.01); *H02M 1/12* (2013.01); *H02M 1/4208* (2013.01); *H02M 1/4216* (2013.01); *H02M 3/33569* (2013.01); *H02M 7/06* (2013.01); *H02M 7/487* (2013.01); *B60K 6/28* (2013.01); *B60L 2210/30* (2013.01); *B60L 2210/40* (2013.01); *B60Y 2200/91* (2013.01); *B60Y 2200/92* (2013.01); *B60Y 2300/91* (2013.01); *H02J 2207/20* (2020.01); *H02M 1/007* (2021.05); *Y02T 10/70* (2013.01); *Y02T 10/7072* (2013.01); *Y02T 10/92* (2013.01); *Y02T 90/12* (2013.01); *Y02T 90/14* (2013.01)

(58) Field of Classification Search
CPC ...... B60L 2210/10; B60L 53/20; B60L 53/60; H02M 1/12; H02M 1/4208; H02M 3/33569; H02M 7/06; Y02T 90/12; Y02T 90/14; Y02T 10/92; Y02T 10/7072; B60K 6/28; B60Y 2200/91; B60Y 2300/91

USPC .................................... 320/109, 140; 701/22
See application file for complete search history.

(56) References Cited

OTHER PUBLICATIONS

Q. Wang, X. Zhang, R. Burgos, D. Boroyevich, A. White and M. Kheraluwala, "Design and optimization of a high performance isolated three phase AC/DC converter," 2016 IEEE Energy Conversion Congress and Exposition (ECCE), Milwaukee, WI, USA, 2016, pp. 1-10, doi: 10.1109/ECCE.2016.7855009. (Year: 2016).*
International Search Report dated Feb. 26, 2018 in PCT/EP2017/082874 filed Dec. 14, 2017.
French Preliminary Search Report dated Aug. 1, 2017 in French Application No. 1662398 filed on Dec. 14, 2016.
Wang,H., et al., "Transportation Electrification: Conductive charging of electrified vehicles," IEEE Electrification Magazine, Dec. 2013, pp. 46-58, XP011541179.
Dusmez, S., et al., "Comprehensive Analysis of High Quality Power Converters for Level 3 Off-board Chargers," 2011 IEEE Vehicle Power and Propulsion Conference, Sep. 6-9, 2011, 10 pages, XP031974886.
Christen, D., et al., "Ultra-Fast Charging Station for Electric Vehicles with integrated split Grid Storage," 2015 17th European Conference on Power Electronics and Applications, Sep. 8, 2015, 11 pages, XP032800324.
Kim, H-S., et al., The high-Efficiency Isolated AC-DC Converter Using the Three-Phase Interleaved LLC Resonant Converter Employing the Y-Connected Rectifier, IEEE Transactions on Power Electronics, vol. 29, No. 8, Aug. 2014, pp. 4017-4028, XP011544088.

* cited by examiner

METHOD FOR CONTROLLING A CHARGING DEVICE ON BOARD AN ELECTRIC OR HYBRID VEHICLE

BACKGROUND

The present invention relates to a method for controlling a three-phase charging device with a three-phase or single-phase input, comprising an AC-DC (alternating current-direct current) insulated converter. Such a charging device is particularly suitable for use as a device on board an electric or hybrid motor vehicle.

Said vehicles are equipped with high-voltage electric batteries and generally comprise on board chargers, i.e., devices for charging electric batteries that are mounted directly on the vehicles. The primary function of said charging devices is to recharge batteries from the electricity available on the electrical distribution grid. They therefore convert an alternating current into a direct current. The criteria desired for the charging devices, and particularly for the onboard chargers, are a high efficiency, a low bulk, galvanic insulation, good reliability, operating safety, a low emission of electromagnetic disruptions, and a low harmonic ratio on the input current.

Charging devices with a three-phase input are known, i.e., that are capable of charging the battery from a three-phase electrical supply grid, as well as single-phase input charging devices, i.e., that are capable of charging the battery from a single-phase electrical supply grid. Three-phase input charging devices have a greater charging power than single-phase input charging devices, with a maximum power of 22 kW. For the connection on a single-phase grid, several charging power levels can be requested, for example 7 kW, 15 kW and 22 kW.

FIG. 1 illustrates a known topology of an isolated charging device 10, onboard an electric or hybrid vehicle for recharging the high-voltage battery 20 of the vehicle from an electric power supply grid 30 to which the onboard charging device 10 is connected via the line impedance 40 of the grid.

In order to carry out the AC-DC conversion function with galvanic insulation, it is known to use a charging device 10 comprising a first AC-DC converter stage, which includes a power factor correction (PFC) circuit 11 in order to limit the input current harmonics, and a second DC-DC (direct current-direct current) converter 12 stage, to regulate the charge and also to perform the insulating function for usage safety. An input filter 13 is traditionally integrated into the input of the onboard charging device 10, upstream from the PFC circuit 11 relative to the electric grid 30.

The PFC circuit 11 is managed by an integrated controller (not shown), which analyzes and corrects, in real time, the appearance of the current relative to the voltage. It deduces the shape errors therefrom by comparison with the rectified sine curve of the voltage and it corrects them by controlling the quantity of energy owing to a high frequency cutting and energy storage in an inductance. Its role is more specifically to obtain a non-phase-shifted current that is as sinusoidal as possible at the input of the power supply of the charger.

For the PFC circuit, it is possible to implement a three-level three-phase rectifier with three switches, commonly known as three-phase Vienna rectifier. The choice of this topology is in fact particularly advantageous in terms of the performance for the power factor correction.

FIG. 2 illustrates the topology of the three-phase input charging device made up of the PFC converter stage 11 of the three-phase Vienna rectifier type 110, which has, as output, two power supply buses 7 and 8, each comprising a positive feeder and a negative feeder and on each of which a DC-DC circuit 14, 16, respectively, is connected, which make up the DC-DC converter stage 12 of FIG. 1. Each DC-DC circuit 14, 16 is a resonant LLC converter comprising a first set of switches, such as MOS transistors, mounted in a full bridge, respectively 140, 160, connected at the input of one of the two power supply buses 7, 8 and at the output, in series, to a resonant circuit L, C and to the primary of a transformer T, the secondary of the transformer being connected to a second set of switches in a complete bridge 141, 161, respectively, the latter being connected to the battery 20, optionally via an output filter 21.

The PFC converter stage 11 of the three-phase Vienna rectifier type 110 comprises three parallel incoming phase connections A, B, C each coupled to a phase of a three-phase electrical supply grid and each connected to a pair of switches S1, S2, S3 forming a switching arm of the three-phase Vienna rectifier via an inductance coil in series L1, L2, L3. An input filter 13 is integrated upstream from the inductances L1, L2, L3 on each phase.

Each pair of switches S1, S2, S3 comprises a serial assembly made up of a first corresponding switch 1H, 2H, 3H, which is steered when a corresponding input current Ia, Ib, Ic is positive, and a second corresponding switch 1L, 2L, 3L that is steered when the corresponding input current is negative. The switches are formed by semiconductor components controlled to close and open, for example MOS transistors (acronym for "Metal Oxide Semiconductor"), connected in anti-parallel with a diode. The switches 1H are also called high switches and the switches 1L, low switches.

The three-phase Vienna rectifier also comprises three parallel branches 1, 2 and 3, each including two diodes D1 and D2, D3 and D4, and D5 and D6, which form a three-phase bridge with six diodes making it possible to rectify the current and the voltage withdrawn from a three-phase electrical power supply grid. Each input of the three-phase Vienna rectifier is connected, by a respective parallel incoming connection, to a connection point located between two diodes of a same branch 1, 2 and 3.

The two shared ends of the branches 1, 2 and 3 make up two output terminals 5 and 6, respectively positive and negative, of the three-phase Vienna rectifier, which are intended to be coupled to the DC-DC device 12.

The switching arms S1, S2, S3 of each phase are also each respectively connected between the connection point located between the two diodes of the first, second and third branches 1, 2 and 3 and a midpoint M of the output voltages V_DC_1 and V_DC_2 of the three-phase Vienna rectifier, respectively corresponding to the voltage on an output capacitor C1 between the positive output terminal 5 of the three-phase rectifier and the midpoint M and the voltage on an output capacitor C2 between the midpoint M and a negative output terminal 6 of the three-phase rectifier.

The use of the LLC (acronym referring to the use of a circuit comprising the combination of two inductances each denoted L and one capacitance denoted C) serial-parallel resonant topology is applied in the DC-DC converter 12, as explained above, and makes it possible to vary the voltage gain of the resonant circuit between the input voltage, or the voltage on the two power supply buses 7, 8 between the stages 11 and 12, and the output voltage (battery voltage 20). Indeed, when one recharges the battery 20, the battery voltage is imposed and varies based on its charge status, which requires the DC-DC converter stage 12 to regulate the power sent to the charging in real time.

To that end, the DC-DC converter stage 12 adapts its gain to make it possible to convert the input voltage, on the supply bus, to the battery voltage. More specifically, the variation in the switching frequency of the switches of the full bridge, respectively 140, 160, associated with the primary of each of the DC-DC circuits, respectively 14 and 16, of the rectifier stage 12, makes it possible to vary the voltage gain of the resonant circuit.

As illustrated in FIG. 3, for the connection to a single-phase input grid 9, it is known to use an independent branch of the PFC input rectifier circuit 11, for example the branch 1, as single-phase charger with voltage doubler, as long as the capacitive midpoint M is grounded. As illustrated in FIG. 4, a configuration for connecting to a single-phase grid 9 is also known using two branches of the PFC input rectifier circuit 11, as long as there is always a re-grounding of the midpoint M.

For a charging device 10 of the aforementioned type with two levels, i.e., with the input rectifier stage 11 connected to the grid, performing the power factor correction PFC function and the DC-DC converter stage 12, allowing the galvanic insulation of the battery 20, two types of regulation are used.

The regulation done by the input rectifier stage 11 connected to the grid is intended to provide a sinusoidal shape to the input current and a regulation of the voltage on the power supply bus. To that end, traditionally a slow external voltage loop (with a bandwidth close to the grid frequency) and a fast current loop (with a bandwidth close to the cutting frequency of the system) are used. The uncoupling between the two loops is done with a strong capacitive value established between the PFC rectifier stage at the input and the DC-DC converter stage.

Yet the solution of the state of the art, based on sending a constant current to the DC-DC converter stage, is a major constraint for the single-phase charging device.

In the single-phase mode, the current sent by the PFC rectifier stage to the DC-DC converter stage is the division of a rectified sinusoidal current. This current has two well-defined frequency components, namely a first component proportional to the division frequency of the system (for example close to a hundred kHz) and a second component proportional to the second harmonic of the grid voltage (100 Hz-120 Hz).

This second low-frequency component is very restrictive for capacitors with two power supply buses at the output of the PFC rectifier stage, and requires connecting a large number of capacitors in parallel, such that the capacitive value is much greater than that which one would need if one only had to worry about uncoupling between the two regulating loops. Furthermore, a concern for optimizing costs means turning toward chemical-type capacitor technologies, which are less immune to grid voltage disruptions than other types of technologies (for example film, ceramic-type capacitor).

BRIEF SUMMARY

As a result, there is a need for an optimized regulating strategy for a charging device having the topology described above, when it is powered by a single-phase grid that in particular makes it possible to reduce the values of the capacitors of power supply buses between the PFC rectifier stage and the DC-DC converter stage.

According to the invention, this aim is achieved with a method for controlling a battery-charging device for a motor vehicle, the charging device comprising a rectifier stage performing a power factor correction function, including three phase connections able to be connected at the input of a single-phase or three-phase electrical power supply grid each by means of a serial inductance coil, and a DC-DC converter stage connected between the rectifier stage and the battery, the rectifier stage being a three-phase Vienna rectifier comprising a three-phase diode bridge and three switching arms integrated into the diode bridge, each comprising a serial assembly of a high switch able to be controlled when the current of the grid is positive and a low switch able to be controlled when the current of the grid is negative, the switching arms being interconnected at a midpoint to which a first and second bus capacitor are connected at the output of the rectifier stage, the DC-DC converter stage comprising first and second LLC resonant converters connected at the input respectively to the first and second power supply bus capacitors by first and second power supply buses and, at the output, to the battery, the method being of the type according to which the current is regulated at the input of the charging device using the three-phase Vienna rectifier, each switching arm being controlled using pulse width modulation control signals, the switching duty factor of which is determined based on the regulation of the input current, the method being characterized in that the charging device is powered by a single phase and the voltage of the first and second power supply buses is regulated independently using first and second LLC resonant converters so as to provide a fixed regulated voltage on each of the power supply buses.

Thus, the three-phase Vienna rectifier regulates only the input current of the charging device, while the DC-DC converter stage regulates the intermediate voltages supplied at the output of the three-phase Vienna rectifier at the midpoint. Thus, in the single-phase connection mode, all of the current withdrawn by the three-phase Vienna rectifier is sent to the battery by the DC-DC converter stage. The current received by the DC-DC converter is therefore no longer direct for single-phase charging and has a strong alternating component at 100 Hz. As a result, the current fluctuations at this frequency in the supply bus capacitors are decreased and it is possible to reduce the value of these capacitors greatly, which is particularly favorable in terms of costs on the one hand and bulk on the other.

Advantageously, in a first single-phase connecting mode corresponding to a first single-phase charging power level from among three charging power levels from low to high, a first and second of the three-phase connections of the charging device are respectively connected to a phase and neutral wire of the single-phase electric grid, the second phase connection being connected to the neutral wire by a connection relay.

In this connection mode, according to a first embodiment, the switches of the switching arm corresponding to the second phase connection of the charging device connected to the neutral wire are kept in the closed state at all times, so as alternatively to use only one of the two LLC resonant converters to charge the battery according to the first charging power level, based on the sign of the input current.

Preferably, each time the sign of the input current alternates, the control of the unused LLC resonant converter is cut.

In this first connection mode, according to a second embodiment, the switches of the switching arms corresponding to the first and second phase connections of the charging device connected to the single-phase electrical grid are systematically switched as a function of the sign of the input current, so as to use the two LLC resonant converters jointly to charge the battery according to the first charging power level.

Advantageously, during a positive alternation of the input current, the high switch and the low switch of the switching arms respectively corresponding to the first and second phase connections of the charging device are made to switch together and, during a negative alternation of the input current, the low switch and the high switch of the switching arms respectively corresponding to the first and second phase connections of the charging device are made to switch together.

Advantageously, in a second single-phase connection mode, corresponding to a second single-phase charging power level from among at least three charging power levels from low to high, a first and second of the three phase connections of the charging device are respectively connected to a phase and neutral wire of the single-phase electric grid, the second phase connection being connected to the neutral wire by a first connection relay, and one connects the first and third phase connection together by a second connection relay.

In this second connection mode, according to a first embodiment, the status is systematically kept closed for the switches of the switching arm corresponding to the second phase connection of the charging device connected to the neutral wire, and the switches of the switching arm corresponding to the first and third phase connections of the charging device connected together are systematically switched as a function of the sign of the input current, so as to alternatively use only one of the two LLC resonant converters to charge the battery according to the second charging power level, based on the sign of the input current.

Advantageously, during a positive alternation of the input current, the high switches of the switching arm respectively corresponding to the first and third phase connections of the charging device connected together are switched together and, during a negative alternation of the input current, the low switches of the switching arms respectively corresponding to the first and third phase connections of the charging device connected together are switched together.

In this second connection mode, according to a second embodiment, the switches of the switching arm corresponding to the first, second and third phase connections of the charging device connected to the single-phase electric grid are systematically switched based on the sign of the input current, so as to use the two LLC resonant converters jointly to charge the battery according to the second charging power level.

Advantageously, in a third single-phase connection mode, corresponding to a third single-phase charging power level from among at least three charging power levels from low to high, a first of the three phase connections of the charging device is connected to a phase wire of the single-phase electric grid and the second and third phase connections of the charging device are connected to said phase wire of the single-phase electric grid by a respective connection relay, the midpoint of the three-phase Vienna rectifier being connected to the neutral wire of the single-phase electric grid.

Advantageously, alternatively only one of the two LLC resonant converters is used to charge the battery according to the third charging power level based on the sign of the input current, and the switches of the switching arms corresponding to the first, second and third phase connections of the charging device connected to one another are systematically switched based on the sign of the input current.

BRIEF DESCRIPTION OF THE DRAWINGS

Other specificities and advantages of the invention will emerge from reading the following description of one particular embodiment of the invention, provided for information but non-limitingly, in reference to the following figures, in which.

DETAILED DESCRIPTION

Figure 5:
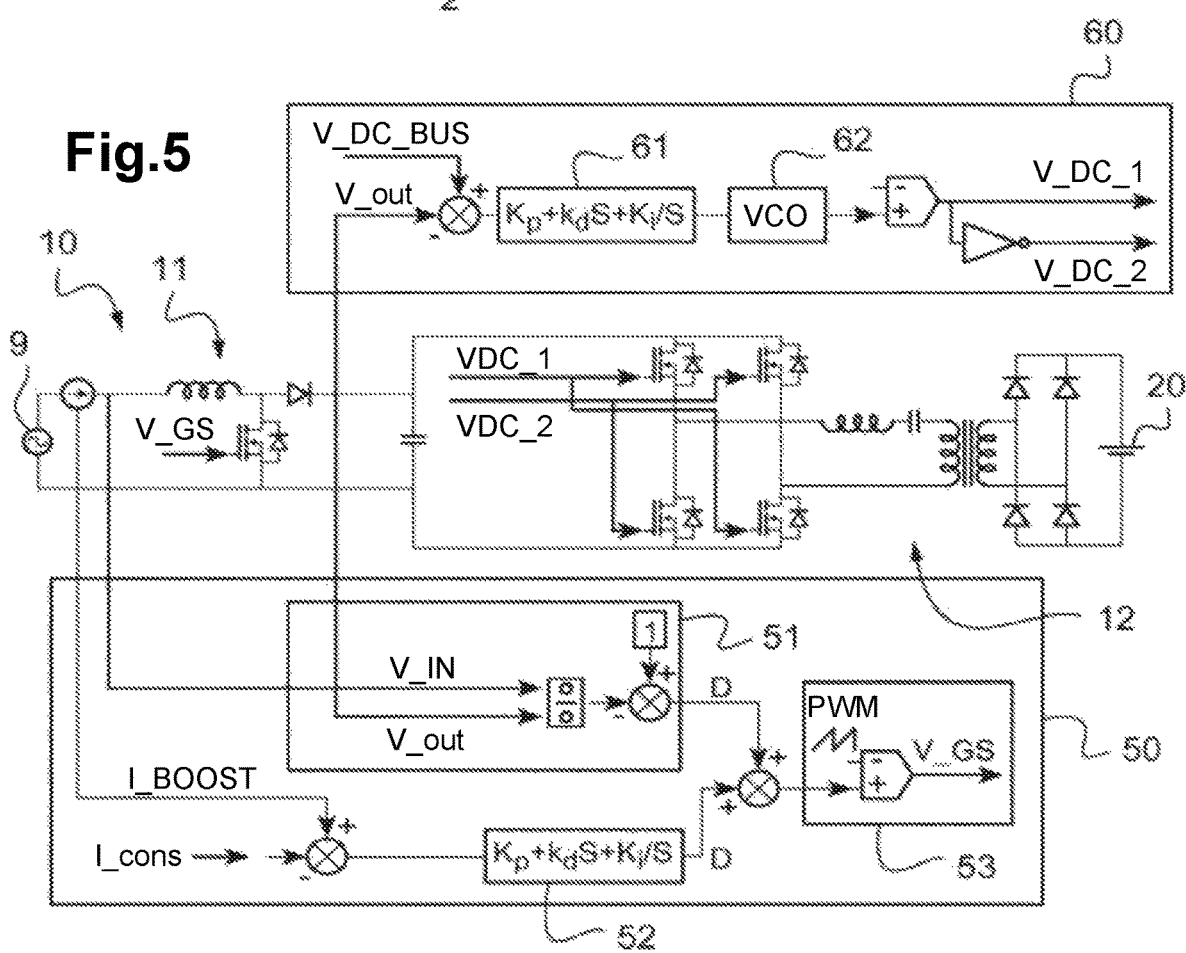
FIG. 5 schematically illustrates the regulating principle for the single-phase charging making it possible to break down different single-phase connection modes from the three-phase basic topology illustrated in FIG. 2.

In reference to FIG. 5, the regulating principle in the single-phase mode of the charging device 10 connected to a single-phase grid 9 is illustrated, with a simple regulating model for each of the blocks, respectively the PFC rectifier stage 11 and the DC-DC converter stage 12.

The regulation in the single-phase mode of the PFC rectifier stage 11 consists of regulating the input current and also of imposing a sinusoidal shape on said current. A control module 50 of the regulation of the PFC rectifier stage 11 is programmed to provide slaving of the input current of the three-phase rectifier stage. This slaving implemented by the control module 50 comprises applying a feedback loop for the input current of the PFC rectifier, having a control variable and a setpoint, and where the control variable of the loop is based on a duty cycle deviation relative to a value calculated in an open loop from voltages measured at the input and output of the PFC rectifier. To that end, an estimator 51 is suitable for calculating the value of the theoretical duty cycle D from input V_IN and output V_out voltages of the PFC rectifier. The deviation relative to said theoretical value D is calculated via the error between the measurement of the input current I_BOOST and a setpoint current Icons, used by a PID regulator 52 to calculate a new duty cycle ratio, where kp, Ki and Kd are the proportionality, integration and derivation gains of the PID regulator 52. It is assumed that the voltage of the power supply buses at the output of the PFC rectifier stage is constant, since it is slaved by the DC-DC rectifier stage.

The deviation of the calculated duty cycle relative to the theoretical value is next provided to a block 53 for generating PWM (Pulse Width Modulation) control signals compared to a ramp in particular, making it possible to generate the various control signals V_GS that are used to control the switches of the switching arms of the PFC rectifier, based on different single-phase charging modes that will be outlined later.

Such a regulating loop is used for each input phase of the PFC rectifier.

Figure 1:
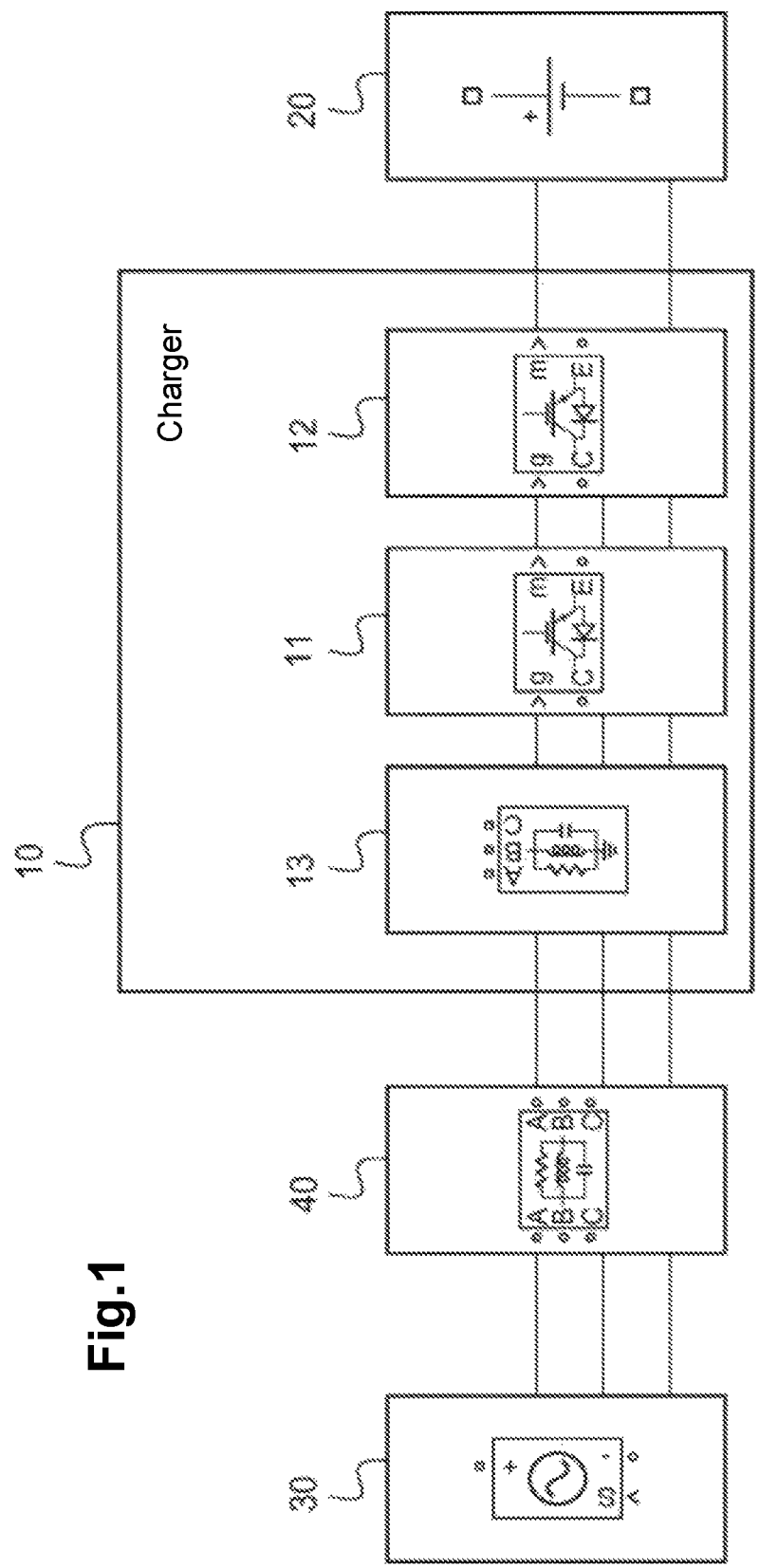
FIG. 1 schematically illustrates a known topology of a battery-charging device intended to be on board an electric or hybrid motor vehicle.
Figure 2:
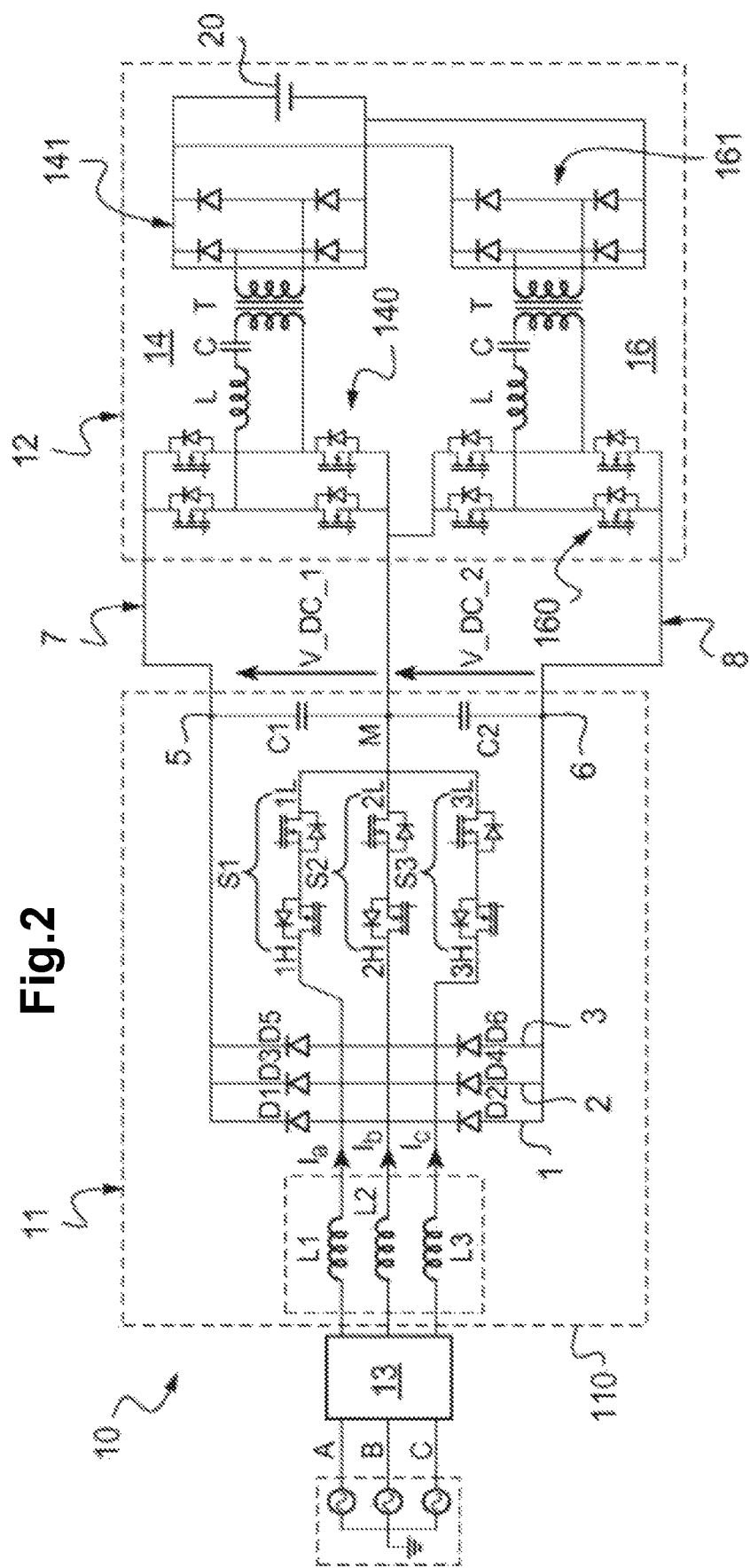
FIG. 2 schematically shows a charging device with two levels made up of a three-phase Vienna rectifier as input with two power supply buses as output, on each of which a DC-DC converter is connected of the LLC resonant converter type, and on which the control method according to the invention is implemented.
Figure 3:
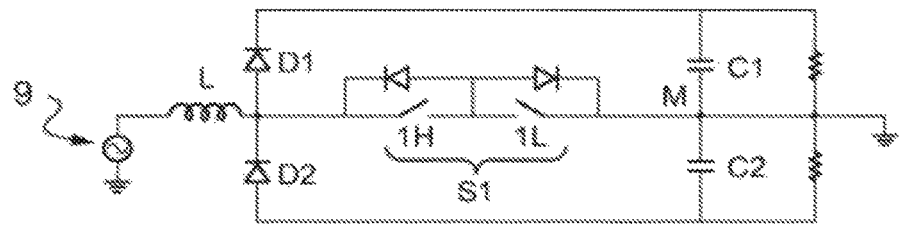
FIG. 3 illustrates a first example configuration for connection to a single-phase grid of the charging device of FIG. 2 for use as a single-phase charger.
Figure 4:
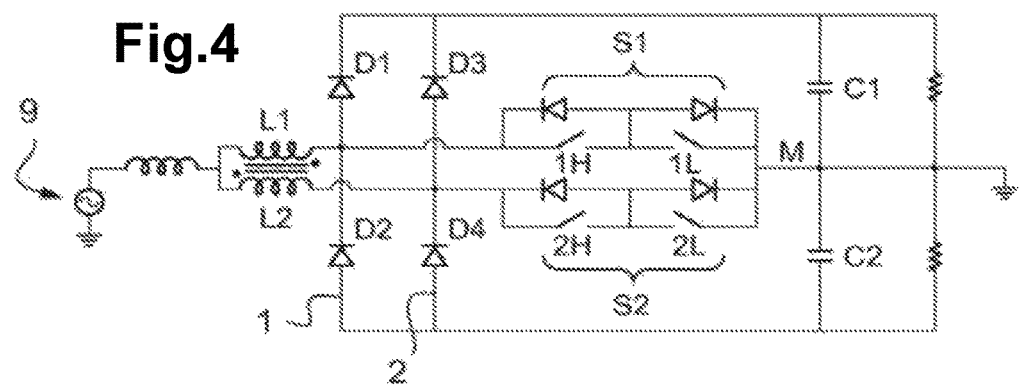
FIG. 4 illustrates a first example configuration for connection to a single-phase grid of the charging device of FIG. 2 for use as a single-phase charger.

Regarding the DC-DC converter stage 12, we have seen above in reference to FIG. 2 that the selected topology is that of a LLC resonant converter, the function of which is to adapt the voltage between the power supply buses at the output of the PFC rectifier 11 and the battery 20. In particular, the variation, over the course of charging, in the switching frequency of the transistors of the full bridge connected to the primary of the converter makes it possible to vary the transfer function of the resonant circuit. Traditionally, the DC-DC converter is used to regulate the output voltage sent to the battery. The regulating principle implemented here consists of regulating the voltage over the two power supply buses at the input of the DC-DC converter, respectively V_DC_1 and V_DC_2, using the DC-DC converter. Thus, it is the DC-DC converter that regulates zone input voltage, corresponding to the output voltage of the PFC rectifier.

A module 60 for controlling the regulation of the converter stage 12 is programmed to provide this regulation. Each LLC resonant converter making up the DC-DC converter 12 in the selected topology will have its own regulating loop to regulate the voltage independently on the power supply bus to which it is connected. More specifically, the voltage error between the measurement of the voltage of the power supply bus V_DC_BUS and the voltage V_out desired at the output of the PFC rectifier is provided to a PID regulator 61 of the control module 60, which will calculate a new voltage value, which is provided in turn to a voltage-controlled oscillator 62, making it possible to define the switching frequency necessary to impose on the resonant LLC converter in order to provide a fixed regulated voltage on each of the power supply buses, respectively V_DC_1 and V_DC_2. The two diagonals of switches of the full bridge of switches at the primary of the LLC resonant converter are therefore switched with a fixed duty cycle (50%) and a frequency defined by the regulating loop as indicated above.

The control module 60 is therefore programmed automatically to provide a regulation of the power supply bus voltage at a constant voltage using the DC-DC converter during the charging of the battery, whether in the three-phase connection mode or in the single-phase connection mode of the charging device.

We will now break down different single-phase connection modes of the charging device, which are all based on the same basic three-phase topology of the charging device as described in reference to FIG. 2 and which advantageously make it possible to develop a charging device capable of adapting to different charging power levels requested in single-phase mode, in particular 7 kW, 15 kW and 22 kW. This is possible without altering the overall hardware configuration of the charging device, aside from an adaptation of the components used for the power, only an adaptation of the control of the switching arms of the PFC rectifier being necessary to allow the charging device to adapt to the different single-phase connection modes of the charging device.

The maximum three-phase charging power is 22 kW. By drawing an analogy by arm of the PFC rectifier 11, one can say that each arm of the PFC rectifier can pass a power of 22 kW/3, or about 7 kW. The two LLC resonant converters 14, 16 are dimensioned such that they each have a power of about 11 kW. The objective is therefore to break down different single-phase connection modes making it possible to adapt to several requested power levels, in particular 7 kW, 15 kW and 22 kW, while minimizing the changes to be made to the charging device.

Figure 6:
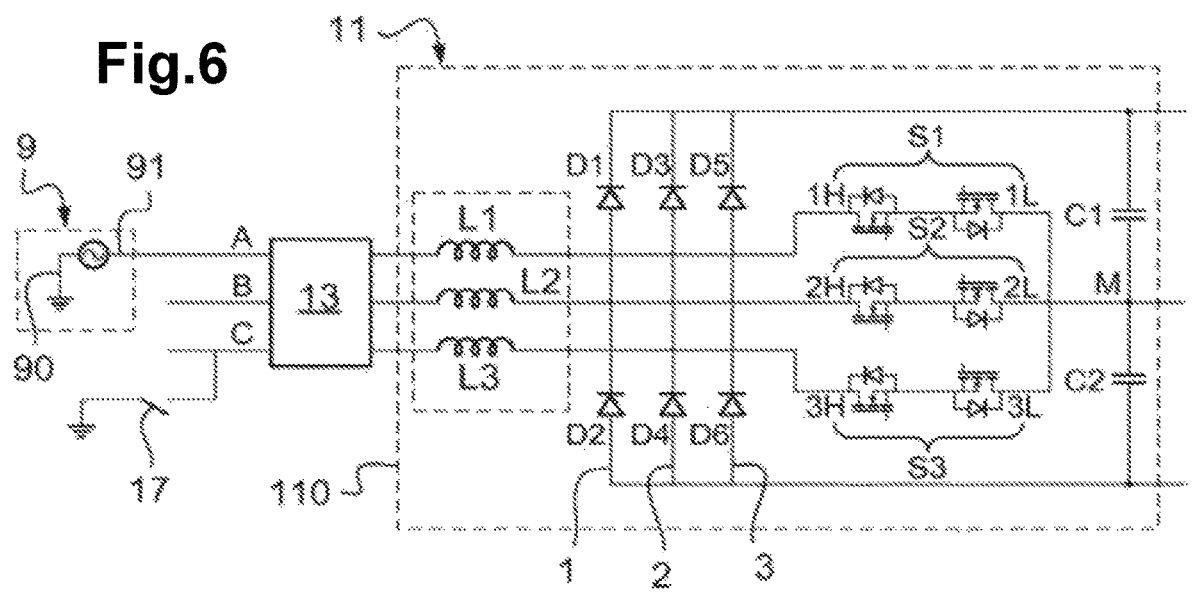
FIGS. 6 and 7 illustrate a first single-phase connection mode of the charging device illustrated in FIG. 2, corresponding to a first charging power level requested in single-phase mode, which uses both DC-DC resonant converters alternating to deliver said first requested charging power level.

FIG. 6 describes a first single-phase connection mode of the charging device, making it possible to deliver 7 kW, in single-phase mode, corresponding to a first so-called low charging mode. Indeed, each of the arms of the PFC rectifier being dimensioned for this nominal power, it is possible to manage to deliver 7 kW in single-phase mode without modifying the overall power topology of the charging device. It is necessary only to add a connection relay 17 between the neutral wire 90 of the single-phase grid 9 and one of the phase connections of the charging device, to adapt the latter to the single-phase grid, while the rest of the charging device remains unchanged. Thus, in this first single-phase connection mode, the connection of phase A is connected as input of the charging device to the phase wire 91 of the single-phase electric grid 9, and for example, the connection of phase C to the neutral wire 90 of the single-phase electric grid 9, via the connection relay 17. The connection of phase B associated with the second switching arm of the PFC rectifier is not used.

Figure 7:
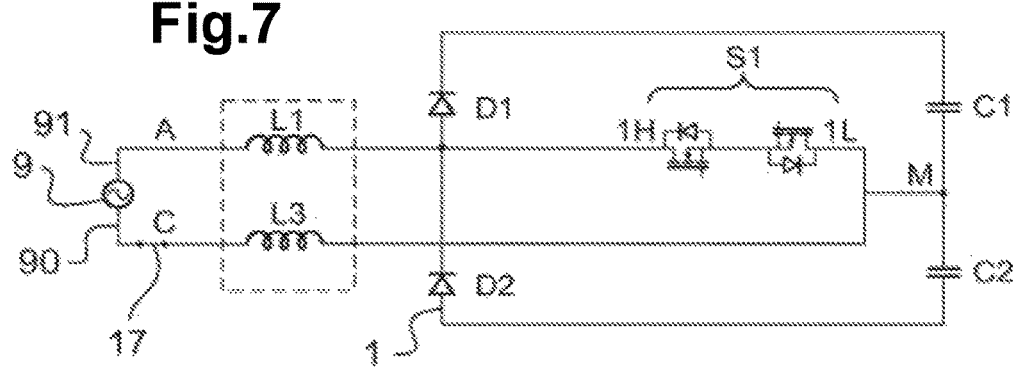

At low power, the interest lies in working with a single DC-DC resonant converter at a time at the output of the PFC rectifier in order to minimize the reactive power consumption of the system. As a result, the switches 3H and 3L of the switching arm S3, corresponding to the phase C connection connected to the neutral wire of the single-phase grid, are kept closed at all times, so as to send the energy to only one resonant LLC converter alternatingly, depending on the sign of the input voltage. FIG. 7 illustrates this configuration of the PFC rectifier connected to the single-phase grid with the two switches of the arm connected to the neutral wire of the grid closed at all times.

In this configuration, for a positive input voltage, the upper switch 1H of the switching arm S1 of the PFC rectifier connected to the phase wire of the grid is controlled in switching by the control signal supplied by the module 50 controlling the PFC rectifier stage 11, while the lower switch 1L is controlled to be in the idle state. The upper and lower switches 3H and 3L of the switching arm connected to the neutral wire being kept in the closed state at all times, the current is sent to the LLC resonant converter of the DC-DC converter stage, the input of which is connected to the bus capacitor C1.

When the input voltage of the charging device is negative, the controlled switch of the switching arm 51 is the lower switch 1L, while the upper switch 1L is controlled to be in the idle state. The upper and lower switches 3H and 3L of the switching arm connected to the neutral wire still being kept in the closed state at all times, the current is sent this time to the LLC resonant converter of the DC-DC converter stage whose input is connected to the bus capacitor C2.

The regulation of each of the two power supply buses is done alternately by the LLC resonant converter associated with said bus. The LLC resonant converter 14 of the DC-DC converter stage 12 connected to the bus capacitor C1 conducts during the positive alternation of the input voltage and the LLC resonant converter 16 of the DC-DC converter stage 12 connected to the bus capacitor C2 conducts during the negative alternation of the input voltage.

The PWM command of the full bridge of switches on the primary side of the LLC resonant converter that is not used during each of the alternations of the input voltage is preferably cut so as to decrease the circulation of reactive current in the system as well as to decrease losses.

Figure 8:
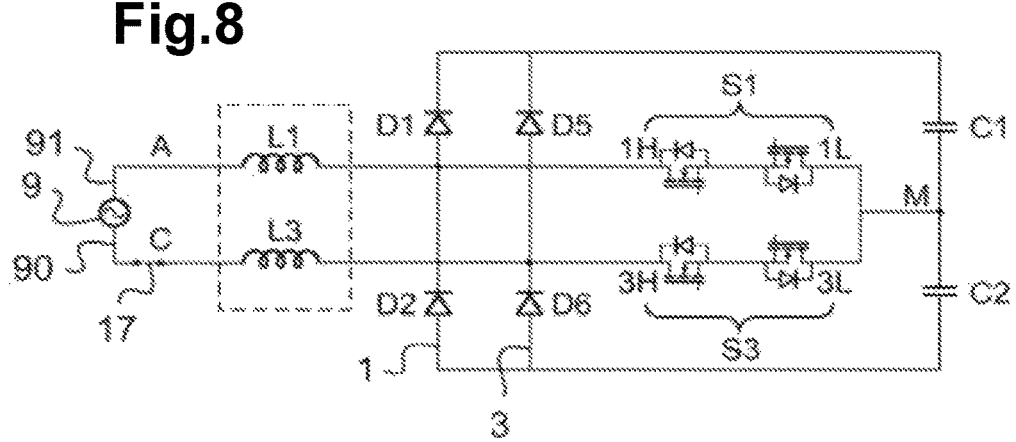
FIG. 8 illustrates an alternative of the first single-phase connection mode of the charging device, in which both resonant converters of the DC-DC converter stage are used in parallel to deliver the first requested charging power level.

FIG. 8 illustrates a second control strategy in the context of the first single-phase connection mode previously described, which still aims to deliver the first charging power level, or 7 kW, but this time while distributing the power over the two LLC resonant converters of the DC-DC converter stage at the output of the PFC rectifier stage, so as to optimize the performance of the system. As a result, unlike the preceding case in reference to FIGS. 6 and 7, the energy is sent to both LLC resonant converters of the DC-DC converter stage at the same time, which are in this case used in parallel to deliver the charging power of 7 kW.

The control strategy making it possible to use both LLC resonant converters at the same time to deliver the power of 7 kW in single-phase charging consists of systematically switching the switches of the switching arms S1 and S3 associated with the phase A and phase C connections respectively connected to the phase and neutral wires of the single-phase grid 9, depending on the sign of the input current.

More specifically, during a positive alternation of the input current, the control module 50 of the PFC rectifier stage 11 is suitable for supplying appropriate control signals making it possible, together, to control the switching of the upper switch 1H of the switching arm S1 of the PFC rectifier connected to the phase wire of the grid 9 and the lower switch 3L of the switching arm S3 connected to the neutral wire of the grid 9, while the lower 1L and upper 3H switches of the switching arms S1 and S3 are left in idle mode.

During a negative alternation of the input current, the control module 50 of the PFC rectifier stage 11 is this time suitable for providing appropriate control signals making it possible to control, together, the switching of the lower switch 1L of the switching arm S1 connected to the phase wire of the grid 9 and the upper switch 3H of the switching arm S3 connected to the neutral wire of the grid 9, while the upper 1H and lower 3L switches of the switching arms S1 and S3 are left in idle mode.

By shifting the control signals of the switching arms S1 and S3 associated with the phase A and C connections, respectively connected to the phase and neutral wires of the single-phase grid 9, one succeeds in having interleaving between the two phases, which makes it possible to double the frequency seen by the inductance of the PFC rectifier without changing the partitioning frequency of the system.

The regulating mode is unchanged. Each of the regulating loops associated with each input phase of the PFC rectifier, as illustrated in FIG. 5, is provided to regulate the input current of the charging device, assuming that the input voltage taken on each phase connection respectively corresponds to half of the voltage delivered by the single-phase grid.

Figure 9:
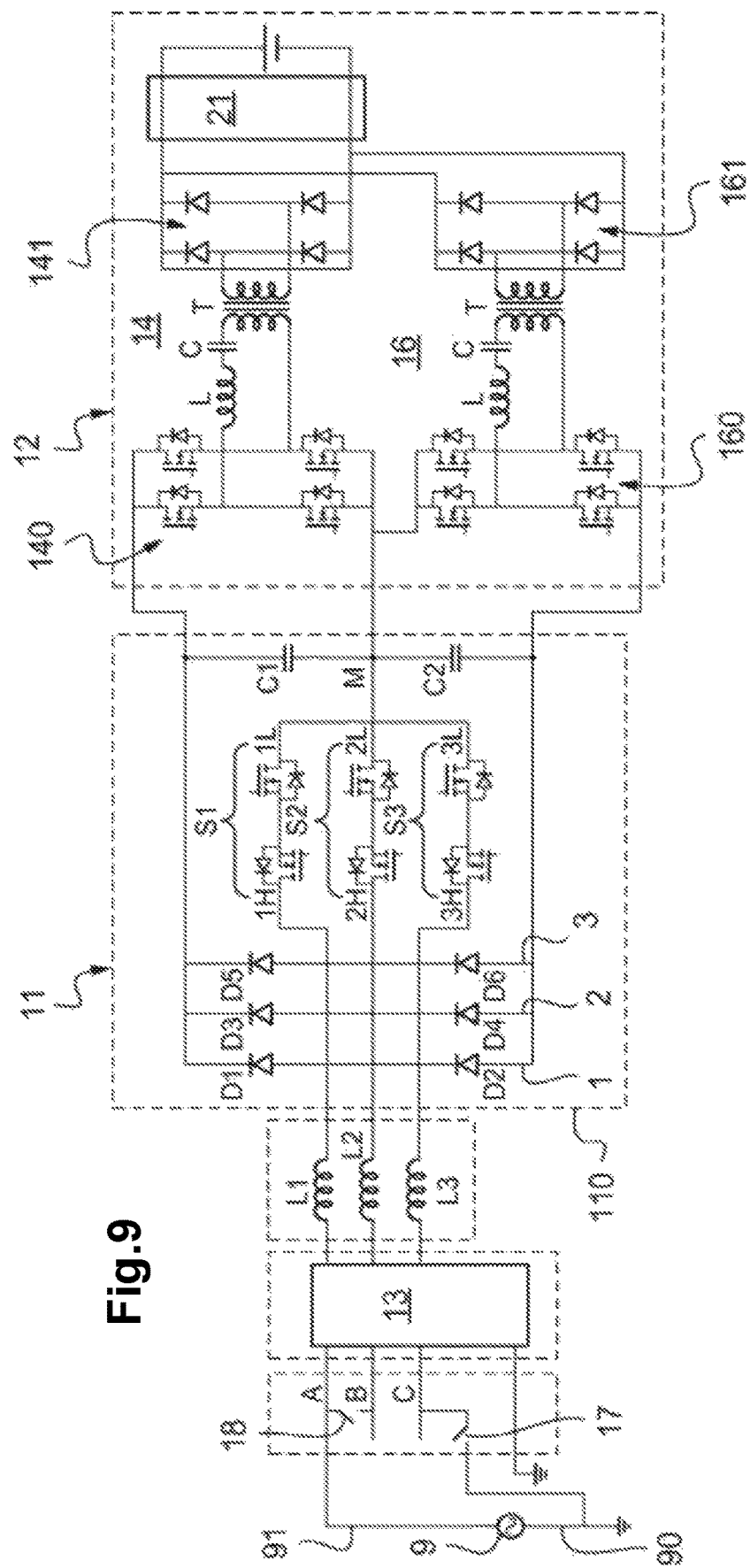
FIG. 9 illustrates a second single-phase connection mode of the charging device illustrated in FIG. 2, corresponding to a second requested single-phase charging power level, greater than the first level.

FIG. 9 describes a second single-phase connection mode of the charging device, corresponding to a second charging power level requested in single-phase mode, called intermediate, of about 15 kW. To do this, the adaptation of the charging device relative to the embodiment described in FIG. 6 consists of adding, in addition to the first connection relay 17, making it possible to connect the phase C connection and the neutral wire 90 of the single-phase grid 9, a second connection relay 18, intended to connect the two phase A and B connections together, which are then both connected to the phase wire 91 of the single-phase grid 9. In this connection, it is possible to keep the same basic topology with the same components for the two switching arms S1 and S2 associated with the phase A and B connections. Indeed, each of the switching arms of the PFC rectifier is dimensioned to be able to pass about 7 kW. Conversely, the third switching arm S3 associated with the phase C connection connected to the neutral wire of the grid and serving as return arm should be re-dimensioned so as to be able to pass the power transmitted by the other two arms connected together at the phase wire of the grid, or about 14 kW. The components of the switching arm S3 will therefore be redimensioned accordingly.

Like for the first single-phase connection mode making it possible to deliver 7 kW in single-phase mode, it is possible to establish two control strategies for this single-phase connection mode, namely a control strategy where the two LLC resonant converters 14, 16 of the converter stage 12 are used alternating to deliver the second requested charging power level, and a strategy where the two converters 14, 16 are used jointly in parallel to deliver this second charging power level.

According to the first strategy seeking to use the two converters 14, 16 alternatingly, the switches 3H and 3L of the switching arm S3 corresponding to the phase C connection connected to the neutral wire of the single-phase grid are kept in the closed state at all times, so as to send the energy on the only one LLC resonant converter in an alternating manner, depending on the sign of the input voltage. However, the power limit for this single-phase connection mode with the two LLC resonant converters 14, 16 used alternating is about 11 kW, which is the nominal power dimensioned for each of the converters 14, 16. On the control side of the switching arms S1 and S2 of the PFC rectifier, the control signals are interleaved so as to limit the ripples experienced by the inductance of the PFC rectifier. In other words, the switching cycle of the switching arm S1 is phase-shifted, relative to the switching cycle of the switching arm S2. Thus, for an input voltage of the positive charge device, the upper switches 1H and 2H of the switching arms S1 and S2 of the PFC rectifier connected to the phase wire of the grid are switched, with a phase shift of 180°, the switches 3H and 3L of the switching arm S3 corresponding to the phase C connection connected to the neutral wire of the grid being kept in the closed state at all times. For a negative input voltage, the lower switches 1L and 2L of the switching arms S1 and S2 are switched, with a phase shift of 180°, the switches 3H and 3L of the switching arms S3 still being kept in the closed state at all times.

According to the second control strategy, the energy is therefore sent to the two LLC resonant converters 14, 16 of the DC-DC converter stage 12, which are in this case used in parallel to deliver the second intermediate charging power.

To that end, the switches of the switching arms S1 and S2 associated with the phase A and B connections connected together to the phase wire of the single-phase grid and the switching arm S3 associated with the phase connection C connected to the neutral wire of the single-phase grid 9 are systematically switched, depending on the sign of the input current.

More specifically, during a positive alternation of the input current, the control module 50 of the PFC rectifier stage 11 is suitable for providing appropriate control signals making it possible to control the switching of the upper switches 1H and 2H of the switching arms S1 and S2 connected to the phase wire of the grid 9 and the lower switch 3L of the switching arms S3 connected to the neutral wire of the grid 9, while the lower switches 1L and 2L of the switching arms S1 and S2 and the upper switch 3H of the switching arms S3 are left in idle mode.

During a negative alternation of the input current, the switching of the lower switches 1L and 2L of the switching arms S1 and S2 connected to the phase wire of the grid 9 and the upper switch 3H of the switching arm S3 connected to the neutral wire of the grid 9 is controlled, while the upper switches 1H and 2H of the switching arms S1 and S2 and the lower switch 3L of the switching arm S3 are left in idle mode.

Figure 10:
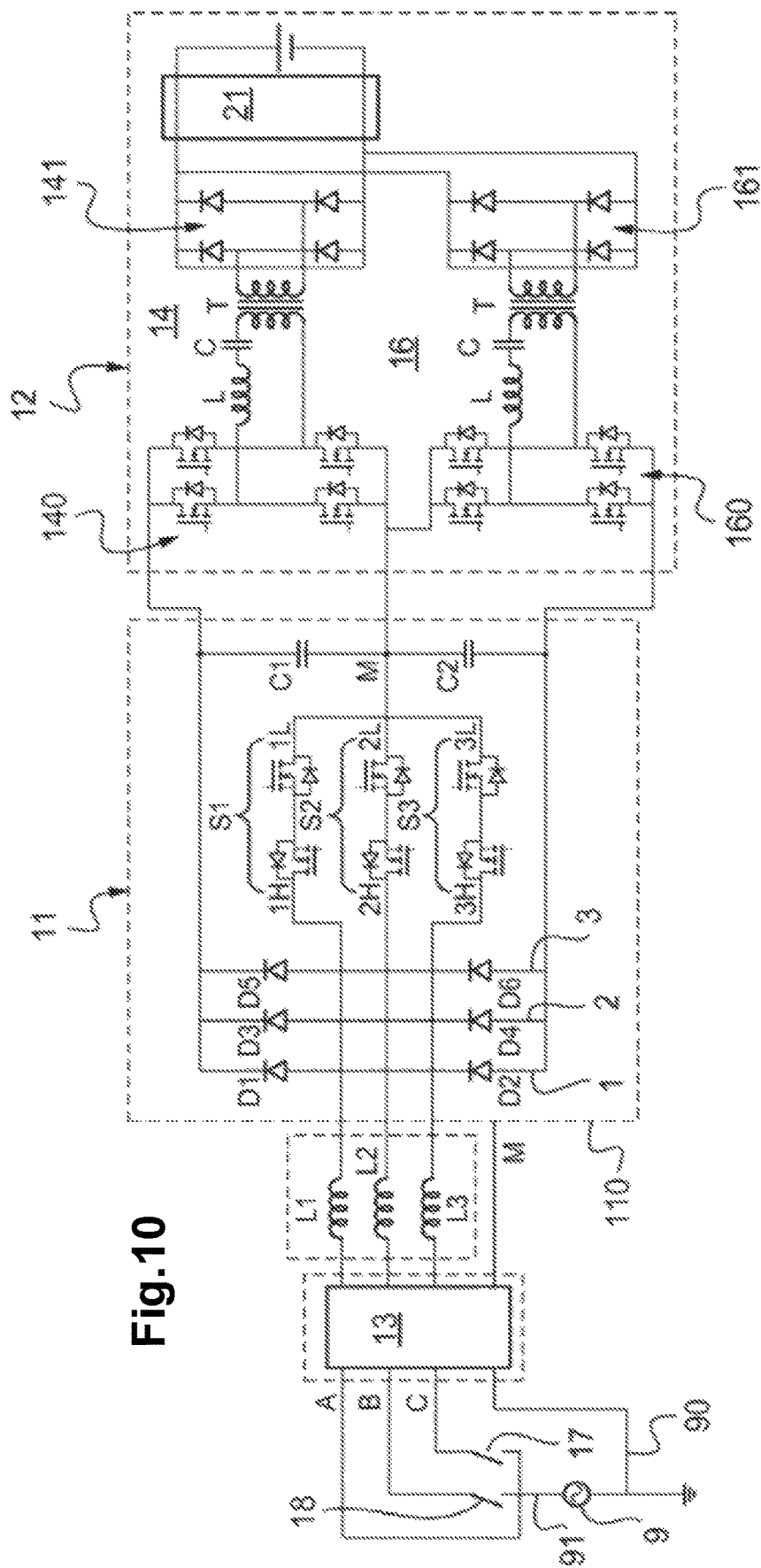
FIG. 10 illustrates a third single-phase connection mode of the charging device illustrated in FIG. 2, corresponding to a third charging power level requested in single-phase mode, greater than the first and second levels.

FIG. 10 describes a third single-phase connection mode of the charging device, corresponding to a third charging power level requested in single-phase mode, called high, of about 22 kW. In this third single-phase connection mode, the three phase A, B and C connections of the PFC rectifier are connected in parallel to the phase wire 91 of the single-phase grid 9. The phase A connection is for example connected directly to the phase wire and two connection relays 17, 18 are added to respectively connect the phase B and C connections of the PFC rectifier to the phase wire 91. Furthermore, the input filter 13 of the rectifier is connected to the neutral wire 90 of the single-phase grid 9. Indeed, according to this third single-phase connection mode, the midpoint M of the power supply bus capacitors must be connected to said neutral wire via the input filter 13.

In this connection mode, the midpoint M being connected to the neutral, it is precluded to be able to send the energy to the two LLC resonant converters 14, 16 of the converter stage 12 at the same time. As a result, the two LLC resonant converters 14, 16 are used alternatingly to send the charging power of 22 kW to the battery 20. As a result, each of these converters must be dimensioned for a nominal power of 22 kW instead of 11 kW for the two single-phase connection modes previously described.

Regarding the control of the switching arms of the PFC rectifier, during a positive alternation of the input current, the module 50 for controlling the PFC rectifier stage 11 is suitable for providing control signals making it possible to control the switching of the upper switches 1H, 2H and 3H respectively of the switching arms S1, S2 and S3 connected to the phase wire of the grid 9, while the lower switches 1L, 2L and 3L of the switching arms S1, S2 and S3 are left in idle mode. During a negative alternation of the input current, the switching of the lower switches 1L, 2L and 3L respectively of the switching arms S1, S2 and S3 connected to the phase wire of the grid 9 is commanded, while the upper switches 1H, 2H and 3H are left in idle mode. The control signals of the switches are interleaved, preferably with a phase shift of 120°, so as to limit the current fluctuations.

The invention claimed is:

1. A method for controlling a battery-charging device for a motor vehicle, the charging device comprising a rectifier stage performing a power factor correction function, including three phase connections able to be connected at the input of a single-phase or three-phase electrical power supply grid each by a serial inductance coil, and a DC-DC converter stage connected between the rectifier stage and a battery, the rectifier stage being a three-phase Vienna rectifier comprising a three-phase diode bridge and three switching arms integrated into the diode bridge, each switching arm comprising a serial assembly of a high switch able to be controlled when the current of the grid is positive and a low switch able to be controlled when the current of the grid is negative, the switching arms being interconnected at a midpoint to which a first and second bus capacitor are connected at the output of the rectifier stag, the DC-DC converter stage comprising first and second LLC resonant converters connected at the input respectively to the first and second power supply bus capacitors by first and second power supply buses and, at the output, to the battery, the method being of the type according to which the current is regulated at the input of the charging device using the three-phase Vienna rectifier, each switching arm being controlled using pulse width modulation control signals, the switching duty factor of which is determined based on the regulation of the input current, the method comprising powering the charging device by a single phase and regulating the voltage of the first and second power supply buses independently using the first and second LLC resonant converters so as to provide a fixed regulated voltage on each of the power supply buses.

2. The method according to claim 1, wherein, in a first single-phase connecting mode corresponding to a first single-phase charging power level from among three charging power levels from low to high, first and second of the three-phase connections of the charging device are respectively connected to a phase and neutral wire of the single-phase electric grid, the second phase connection being connected to the neutral wire by a connection relay.

3. The method according to claim 2, wherein the switches of the switching arm corresponding to the second phase connection of the charging device connected to the neutral wire are kept in the closed state at all times, so as alternatively to use only one of the two LLC resonant converters to charge the battery according to the first charging power level, based on the sign of the input current.

4. The method according to claim 3, wherein each time the sign of the input current alternates, the control of the unused LLC resonant converter is cut.

5. The method according to claim 2, wherein the switches of the switching arms corresponding to the first and second phase connections of the charging device connected to the single-phase electrical grid are systematically switched as a function of the sign of the input current, so as to use the two LLC resonant converters jointly to charge the battery according to the first charging power level.

6. The method according to claim 5, wherein during a positive alternation of the input current, the high switch and the low switch of the switching arms respectively corresponding to the first and second phase connections of the charging device are made to switch together and, during a negative alternation of the input current, the low switch and the high switch of the switching arms respectively corresponding to the first and second phase connections of the charging device are made to switch together.

7. The method according to claim 1, wherein, in a second single-phase connection mode, corresponding to a second single-phase charging power level from among at least three charging power levels from low to high, a first and second of the three phase connections of the charging device are respectively connected to a phase and neutral wire of the single-phase electric grid, the second phase connection being connected to the neutral wire by a first connection relay, and one connects the first and third phase connection together by a second connection relay.

8. The method according to claim 7, wherein the status is systematically kept closed for the switches of the switching arm corresponding to the second phase connection of the charging device connected to the neutral wire, and the switches of the switching arm corresponding to the first and third phase connections of the charging device connected together are systematically switched as a function of the sign of the input current, so as to alternatively use only one of the two LLC resonant converters to charge the battery according to the second charging power level, based on the sign of the input current.

9. The method according to claim 8, wherein during a positive alternation of the input current, the high switches of the switching arm respectively corresponding to the first and third phase connections of the charging device connected together are switched together and, during a negative alternation of the input current, the low switches of the switching arms respectively corresponding to the first and third phase connections of the charging device connected together are switched together.

10. The method according to claim 7, wherein the switches of the switching arm corresponding to the first, second and third phase connections of the charging device connected to the single-phase electric grid are systematically switched based on the sign of the input current, so as to use the two LLC resonant converters jointly to charge the battery according to the second charging power level.

11. The method according to claim 1, wherein, in a third single-phase connection mode, corresponding to a third single-phase charging power level from among at least three charging power levels from low to high, a first of the three phase connections of the charging device is connected to a phase wire of the single-phase electric grid and the second and third phase connections of the charging device are connected to said phase wire of the single-phase electric grid by a respective connection relay, the midpoint of the three-phase Vienna rectifier being connected to the neutral wire of the single-phase electric grid.

12. The method according to claim 11, wherein only one of the two LLC resonant converters is used to charge the battery according to the third charging power level based on the sign of the input current, and the switches of the switching arms corresponding to the first, second, and third phase connections of the charging device connected to one another are systematically switched based on the sign of the input current.

* * * * *